US005190829A

United States Patent [19]

Nybye

[11] Patent Number: 5,190,829

[45] Date of Patent: Mar. 2, 1993

[54] ORNAMENTAL BASEBALL BAT AND METHOD OF MANUFACTURE

[76] Inventor: Lance Nybye, 13275 Blueberry Hill La., Valley Center, Calif. 92082

[21] Appl. No.: 796,782

[22] Filed: Nov. 25, 1991

[51] Int. Cl.[5] ............................................ B32B 21/00

[52] U.S. Cl. ................................ 428/542.4; 156/293; 273/72 R; 428/106; 428/187; 428/537.1

[58] Field of Search ................ 428/542.4, 7, 106, 187, 428/537.1; 273/26 B, 72 A, 72 R; 40/618; 156/98, 293

[56] References Cited

U.S. PATENT DOCUMENTS 1,668,524 5/1928 Bogue .......................... 428/542.4 X
2,944,820 7/1960 Paullus ............................. 273/72 R
3,104,876 9/1963 Salsinger .......................... 273/72 R
4,526,820 7/1985 Haas ..................................... 428/31

*Primary Examiner*—Henry F. Epstein
*Attorney, Agent, or Firm*—George J. Netter

[57] ABSTRACT

A wooden baseball bat (12) has a portion (14) to be ornamented defined (16) and the portion (14) removed by use of a saw, for example. The removed portion is configured into the desired ornamentation and secured into the baseball bat cavity (18) by an adhesive layer (24). An alternative method is to configure the ornamentation directly on the baseball bat by use of router (28) which may optionally be controlled by a computer (30).

11 Claims, 2 Drawing Sheets

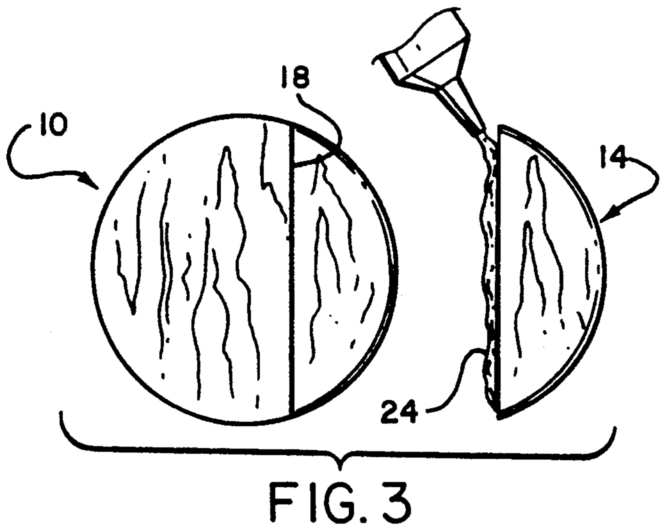
FIG. 3
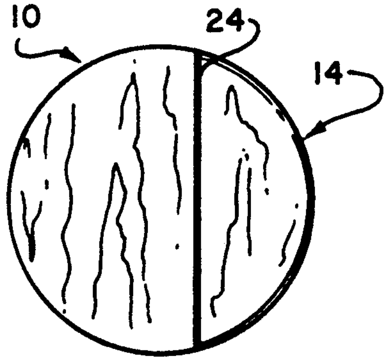
FIG. 4
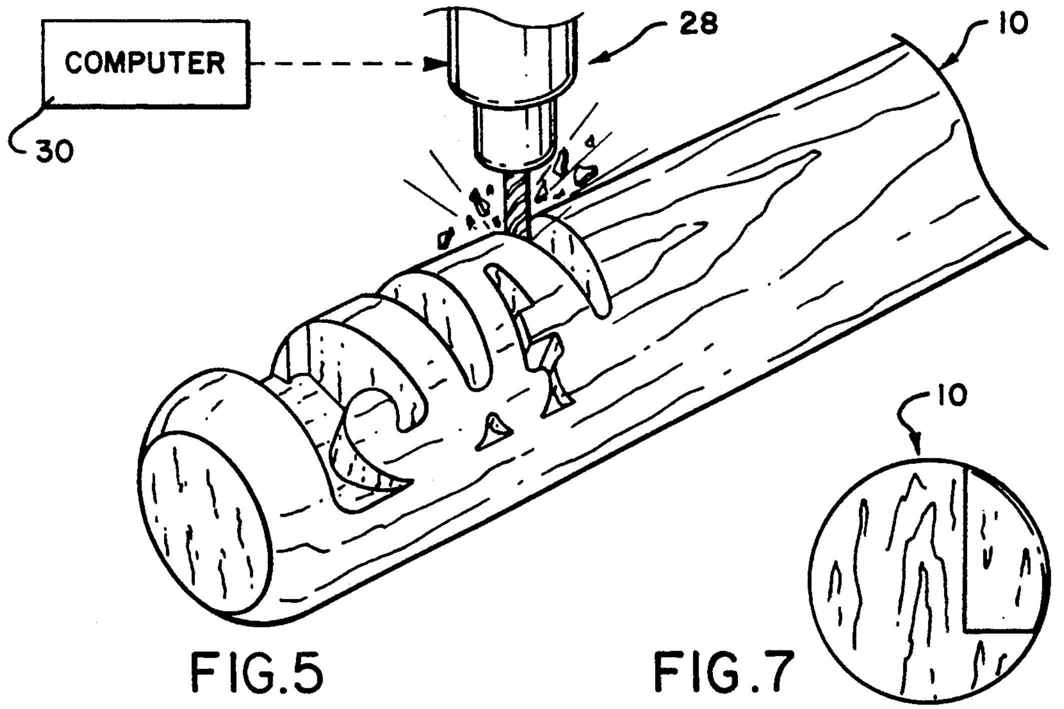
FIG.5
FIG.7
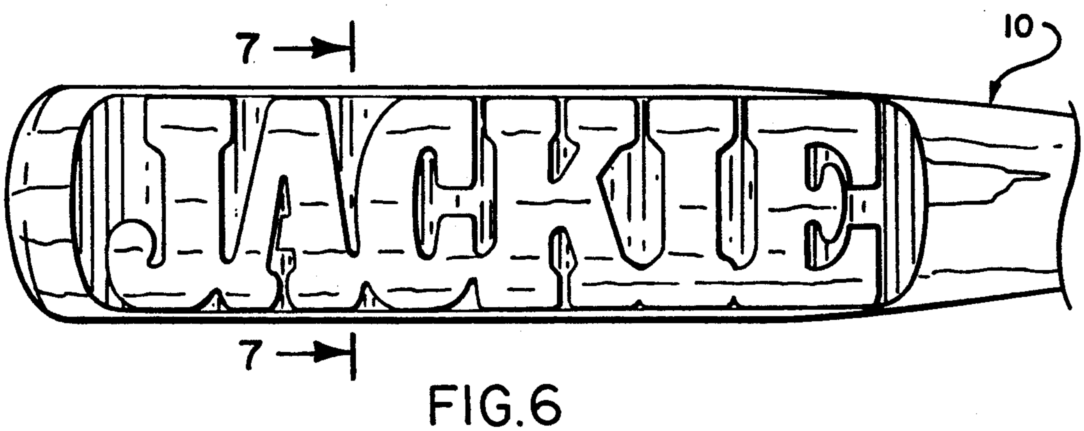
FIG.6

ORNAMENTAL BASEBALL BAT AND METHOD OF MANUFACTURE

BACKGROUND

Field of the Invention

The present invention relates generally to an ornamental baseball bat for display, and, more particularly, to an ornamentally configured baseball bat and method of manufacture.

SUMMARY OF THE INVENTION

A wooden baseball bat to be configured into an ornamental display item in accordance with the method of the present invention initially has a part of the bat material to be used in ornamenting marked (e.g., by a template). The defined portion, also referred to as the primary piece, is elongated generally parallel to the long dimension of the bat and has curved entrance and exit ends.

The primary piece is removed from the baseball bat by using a jigsaw or bandsaw, for example. Next, the primary piece after being removed from the bat is configured into final shape or design such as by cutting initials or a full name of an individual, a logo or custom artwork in the primary piece, for example. This configuring can also be accomplished by a jig saw. Then, the configured and ornamented primary piece is then glued back in place on the bat in such manner as to match the grain exactly. As a final step, the bat is sanded, cleaned and sprayed with a clear lacquer for mounting on a suitable pedestal, for example.

BRIEF DESCRIPTION OF THE DRAWINGS

In the accompanying drawing:

FIG. 3 is an end elevational sectional view of the baseball bat and ornamented part shown prior to assembly;

FIG. 4 is an end sectional view of the baseball bat shown assembled;

FIG. 5 is a perspective view of the invention according to an alternative embodiment;

FIG. 6 is a side elevational view of the ornamented bat of FIG. 5; and

FIG. 7 is an end elevational, sectional view taken along the line 7—7 of FIG. 6.

DESCRIPTION OF A PREFERRED EMBODIMENT

Figure 1:
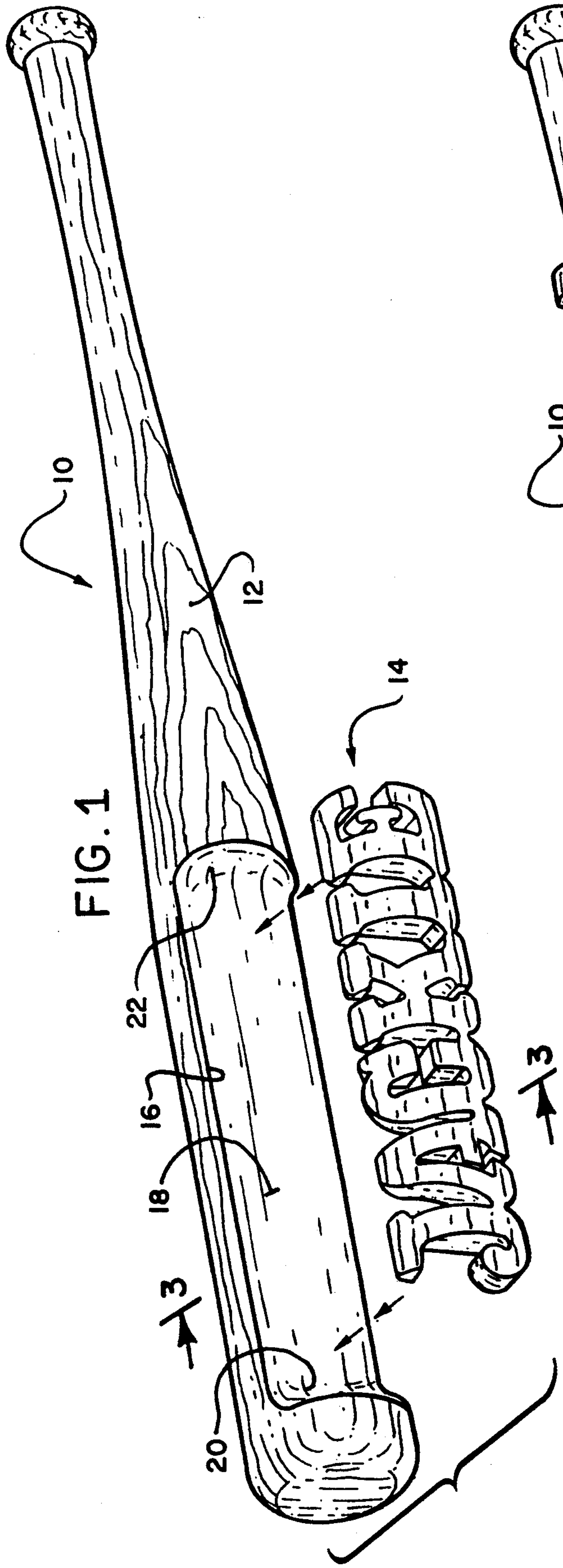
FIG. 1 is a perspective view of an ornamented baseball bat with the ornamented part removed.

Turning now to the drawing and particularly FIG. 1 there is shown an ornamented baseball bat 10 fabricated in accordance with the invention to be described which consists essentially of a typical baseball bat body 12 having a portion thereof enumerated as 14 which is carved, cut or otherwise configured into initials, a name, words or other ornamentation.

As a first step in the practice of the present invention a portion of the baseball bat to be utilized for this purpose is marked on the bat as shown by line 16 using a template or other suitable means. The wood portion defined by line 16 is cut from the bat as a single block, referred to herein as the primary piece, by using a bandsaw or jigsaw, for example. Preferably, the primary piece is symmetrical about the bat longitudinal axis and includes a downwardly curved entrance point as well as a similarly curved exit point leaving a complementary cavity 18 (FIG. 3) having corresponding curved portions identified, respectively, as 20 and 22 (FIG. 1).

Figure 2:
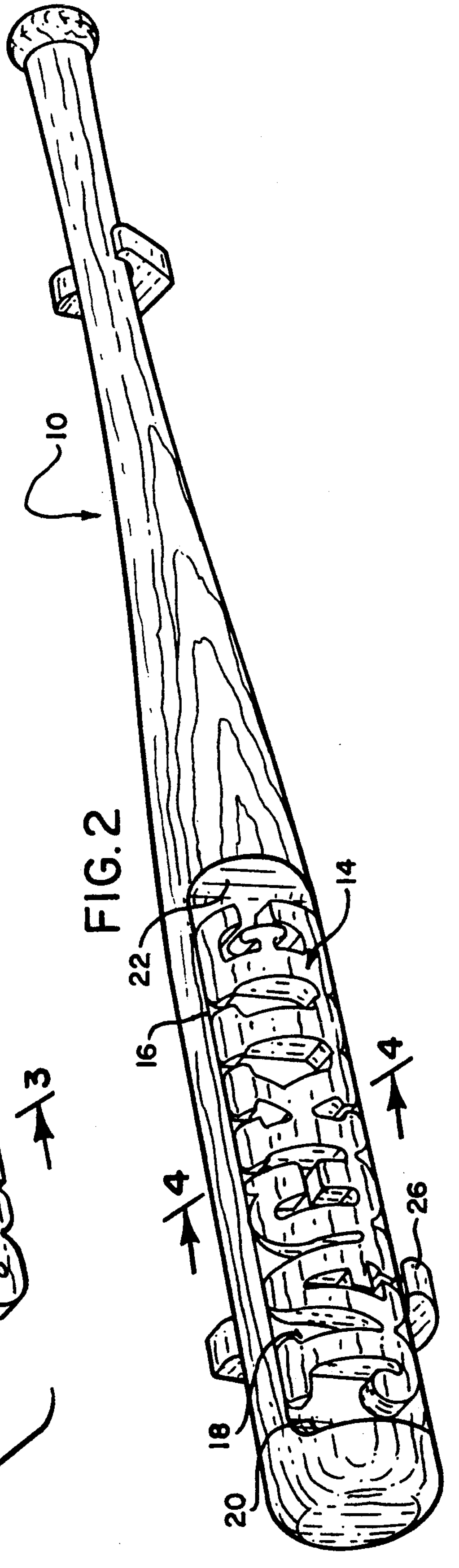
FIG. 2 is a view of the completed ornamented baseball bat shown mounted for display.

As can be seen best in FIGS. 1 and 2, the removed primary piece 14 is then configured by use of a jigsaw, for example, into a desired ornamentation which, for present purposes, is seen to include the name "Jackie". It is important to note that the configured or ornamented primary piece is preferably a unitary member. The configuration is provided to the primary piece in such manner that the ornamentation (JACKIE) can be viewed from what was the outside of the bat on the primary piece.

The removed primary piece 14 after configuration and ornamentation is then adhered by a layer of glue 24, for example, back again onto the bat in the space 18 from which the primary piece had been originally removed (FIGS. 1, 3 and 4). It is important to note that the primary piece is so replaced as to reassume alignment of the bat grain with that of the replaced primary piece. As a final step, the bat with replaced and adhered primary piece is sanded, cleaned and sprayed with a clear lacquer after which it may be mounted onto pedestals 26.

Although in the preferred embodiment described, the primary piece 14 has been removed from the bat before it is configured, it is contemplated that the configuring may be accomplished directly onto the bat by use of a router either manually or computer controlled. More particularly, a three-axis simultaneous profiler/router milling machine 28 with programmable spindle speed control as shown in FIG. 5 can be used to directly rout the lettering or other design on the bat without having to remove and glue back a primary piece 14 as in the first embodiment. Optionally, a computer 30 can be used to control the milling machine 28.

Major manufacturers of profiler/router milling machines which are programmable are Bridgeport Machine, Cincinnati Millicron and Gorton. Transitional programs for working from personal computer generated digitized artwork are CAD-CAM vers 10 w/post to direct Fanuc Control Model O, or Allen Bradley equivalent controller mounted on a three-axis profiler.

Although the present invention has been described in connection with preferred embodiments, it is understood that those skilled in the appertaining art may make changes which are within the spirit of the invention as described and within the ambit of the appended claims.

What is claimed is:

1. A method of ornamenting a wooded baseball bat having a large diameter end portion and an opposite end portion of a smaller diameter forming a handle, comprising the steps of:

- removing a unitary piece of wood from the bat leaving a cavity;
- configuring one side of the unitary piece of wood; and
- securing another side of configured piece of wood within the bat cavity.

2. A method as in claim 1, in which the unitary piece of wood is removed by sawing.

3. A method as in claim 1, in which the unitary piece of wood is ornamentally configured by sawing.

4. A method as in claim 1, in which the ornamentally configured unitary piece of wood is secured in the bat cavity by an adhesive.

5. A method as in claim 1, in which the wooden baseball bat has visible outer surface grain and the ornamentally configured unitary piece of wood is secured within the bat cavity in such manner as to maintain original continuity of the grain.

6. A method as in claim 1, in which the bat and ornamentally configured unitary wood piece secured within the cavity are sanded and varnished.

7. A method of providing a surface ornamentation on a wooden baseball bat, comprising the steps of:

positioning the wooden bat to enable being worked on by a motor driven router;

controlling router operation by a digital computer; and providing instructions to the computer via a computer program for routing a predetermined design into the bat outer surface.

8. An ornamental baseball bat constructed from a conventional wooden baseball bat having a large diameter end portion and a lesser diameter end portion serving as a handle, comprising:

a dished-out cavity formed in the baseball bat peripheral side wall of the large diameter end portion; and an ornamentally configured piece of wood located within the cavity so as to be visible from three sides.

9. An ornamental baseball bat as in claim 8, in which the configured piece of wood is formed from a unitary piece of wood removed from the cavity.

10. An ornamental baseball bat as in claim 9, in which the configured piece of wood is secured within the cavity by a quantity of adhesive.

11. An ornamental baseball bat as in claim 8, in which the piece of wood located within the cavity is configured by a router while the piece of wood is integral with the remainder of the baseball bat.

* * * * *